(12) United States Patent
Kugel et al.

(10) Patent No.: US 9,252,613 B2
(45) Date of Patent: Feb. 2, 2016

(54) MANAGING LOAD POWER CONSUMPTION BASED ON STORED ENERGY RATE

(76) Inventors: Jason J. Kugel, Milwaukee, WI (US); Brian P. Scharles, Mukwonago, WI (US)

( * ) Notice: Subject to any disclaimer, the term of this patent is extended or adjusted under 35 U.S.C. 154(b) by 1977 days.

(21) Appl. No.: 12/356,733

(22) Filed: Jan. 21, 2009

(65) Prior Publication Data

US 2010/0182774 A1   Jul. 22, 2010

(51) Int. Cl.
*H01M 10/44* (2006.01)
*H02J 7/00* (2006.01)

(52) U.S. Cl.
CPC ................. *H02J 7/0047* (2013.01)

(58) Field of Classification Search
CPC .......................................................... H02J 7/35
USPC ........................................................ 320/101
See application file for complete search history.

(56) References Cited

U.S. PATENT DOCUMENTS

| | | | |
|---|---|---|---|
| 5,855,692 A * | 1/1999 | Kaji et al. ...................... | 136/245 |
| 6,084,379 A * | 7/2000 | Buniatyan ...................... | 320/101 |
| 6,448,489 B2 * | 9/2002 | Kimura et al. ................. | 136/244 |
| 6,678,176 B2 * | 1/2004 | Lumsden ........................ | 363/95 |
| 6,693,556 B1 | 2/2004 | Jones et al. ................... | 340/907 |
| 6,889,122 B2 * | 5/2005 | Perez ............................. | 700/295 |
| 6,943,698 B2 | 9/2005 | Jones et al. ................... | 340/907 |
| 6,984,970 B2 * | 1/2006 | Capel ............................. | 323/299 |
| 7,030,597 B2 * | 4/2006 | Bruno et al. .................. | 323/299 |
| 7,275,501 B1 * | 10/2007 | Laceky ........................ | 119/57.92 |
| 2005/0104747 A1 * | 5/2005 | Silic et al. ...................... | 340/944 |
| 2005/0270175 A1 | 12/2005 | Peddie et al. ................. | 340/907 |
| 2008/0178032 A1 | 7/2008 | Walrath ........................ | 713/340 |

FOREIGN PATENT DOCUMENTS

JP   2006-146295   6/2006

OTHER PUBLICATIONS

PCT Search Report and Written Opinion from PCT/US2010/020171 dated May 17, 2010.

* cited by examiner

*Primary Examiner* — Yalkew Fantu
(74) *Attorney, Agent, or Firm* — Absolute Technology Law Group, LLC

(57) ABSTRACT

A system includes an energy storage device, a power generator, and a controller. The energy storage device is operable to power a load. The power generator is operable to charge the energy storage device. The controller is operable to generate an energy storage metric representing a quantity of energy stored in the energy storage device over a first time interval and adjust at least one power consumption characteristic of the load for a second time interval based on the energy storage metric.

32 Claims, 3 Drawing Sheets

ND POWER CONSUMPTION BASED ON STORED ENERGY RATE

MANAGING LOAD POWER CONSUMPTION BASED ON STORED ENERGY RATE

CROSS-REFERENCE TO RELATED APPLICATIONS

Not applicable.

BACKGROUND

The disclosed subject matter relates generally to managing the power usage of a device that uses stored energy to attempt to increase the length of time the device can be operated without depleting the source of stored energy.

Many electrical devices are provided with electrical energy from renewable energy sources, such as solar or wind. A power generator, such as a solar panel or wind turbine, provides electrical energy for the device. To compensate for time periods when power is not being generated (e.g., during periods of darkness or when there is no wind), an energy storage device, such as a battery, is typically employed to power the device. The amount of time that the device can be powered by the battery depends on factors such as the capacity of the battery, the power demanded by the load, and the amount of energy that is stored in the battery when the power generator is active (i.e., during daylight hours or in the presence of wind). Typically, designers select the battery capacity based on the expected service conditions of the device. However, during abnormal environmental conditions, such as prolonged bad weather, it is possible that the battery may not be charged sufficiently during the charging portion of the day to maintain its level of charge. Eventually, the battery may be depleted and the device may cease to operate. Increasing the battery capacity to broaden the range of environmental conditions under which the system may maintain an adequate charge increases the weight and cost of the battery.

There have been various attempts to optimize the use of solar energy stored in rechargeable batteries to provide longer run times for loads such as light emitting diodes (LEDs) that are powered from these batteries. For example, one technique monitors and stores the battery voltage at the start of a selected time interval and adjusts the brightness of the LEDs by evaluating the battery voltage. One difficulty with this method is that the actual amount of energy stored in the rechargeable battery is not a linear function of battery voltage. In some applications, when fully charged, the battery voltage might decrease only 10% as more than 70% of the battery power is consumed. Then, as the battery is becoming more discharged, the battery voltage might decrease by 30% as 20% of the battery power is consumed. Therefore, using the battery voltage as an indicator of remaining battery power capacity suffers from such non-linear characteristics.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a system including an energy storage device, a power generator, and a controller. The energy storage device is operable to power a load. The power generator is operable to charge the energy storage device. The controller is operable to generate an energy storage metric representing a quantity of energy stored in the energy storage device over a first time interval and adjust at least one power consumption characteristic of the load for a second time interval based on the energy storage metric.

Another aspect of the disclosed subject matter is seen in a system including a lighting device, a rechargeable battery, a solar panel, and a controller. The rechargeable battery is operable to power the lighting device. The solar panel is operable to charge the rechargeable battery. The controller is operable to generate an energy storage metric representing a power output of the solar panel over a first time interval and adjust at least one power consumption characteristic of the lighting device for a second time interval based on the energy storage metric.

Yet another aspect of the disclosed subject matter is seen in a method for controlling power consumption of a load powered by an energy storage device. Energy stored in the energy storage device by a power generator is monitored to generate an energy storage metric representing a quantity of energy stored in the energy storage device over a first time interval. A power consumption characteristic of the load is adjusted for a second time interval based on the energy storage metric.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
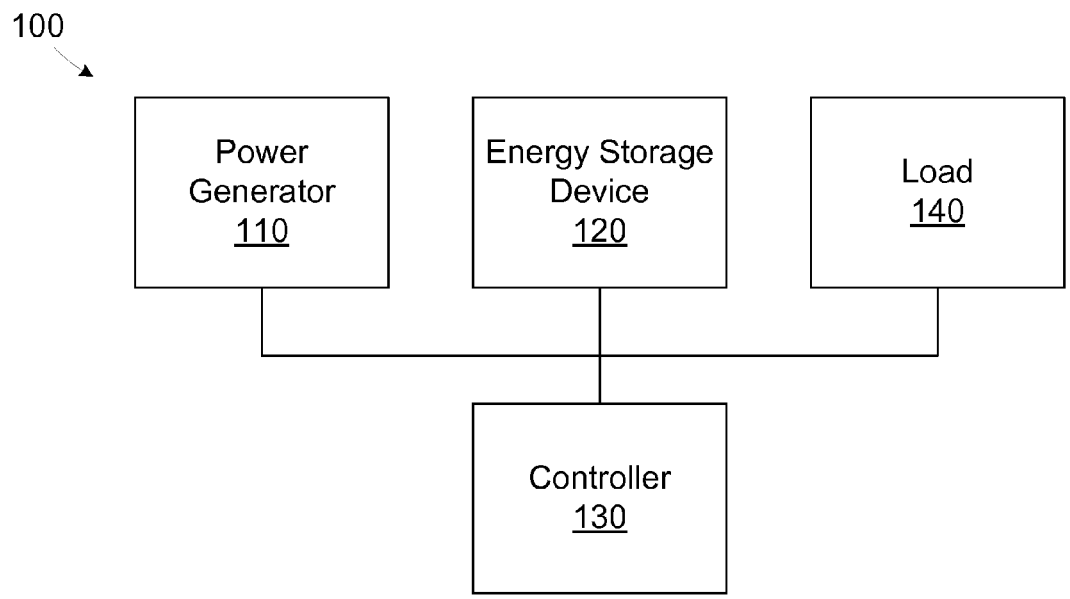
FIG. 1 is a simplified block diagram of a system for managing load power consumption in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a power management system 100. The system 100 includes a power generator 110, an energy storage device 120, and a controller 130 that cooperate to manage power delivered to an electrical load 140. In the illustrated embodiment, the power generator 110 may be a solar panel, but other generators that may exhibit varying power output characteristics may be employed. The energy storage device 120 may be a battery or a capacitor operable to store energy generated by the power generator 110 and deliver power to the load 140 when the power generated is less than the power demanded by the load 140. Various types of electrical loads 30 may be powered by the system 100.

In the general embodiment of FIG. 1, the controller 130 monitors the amount of energy stored in the energy storage device 120. The monitoring may take place over a particular time interval, that may be static or dynamic. The controller 130 automatically adjusts load parameters of the load 140 for a subsequent time interval to attempt to conserve battery power during periods of low power generation. The length of the time interval over which the energy storage is monitored may vary depending on the particular implementation. For example, the particular time period monitored may vary depending on the nature of the load 140, the nature of the power generator 110, and the nature of the energy storage device 120.

Figure 2:
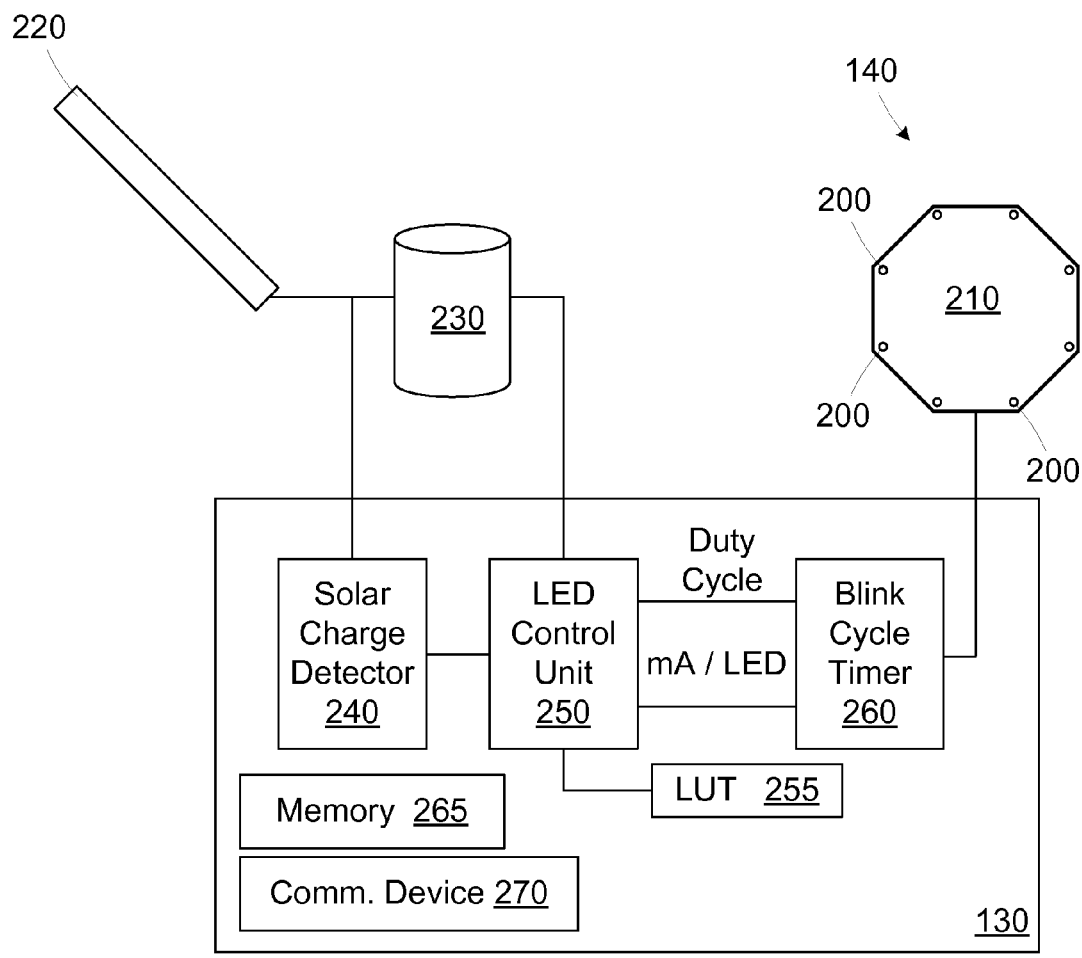
FIG. 2 is a simplified block diagram of a system for managing power consumption of an LED load powered by a solar panel feeding a battery in accordance with another illustrative embodiment of the present subject matter.

For illustrative purposes, the operation of the power management system 100 is described as it may be applied to powering a load 140 including one or more light emitting diodes (LEDs). For example, as shown in FIG. 2, the load 140 may be a plurality of LEDs 200 may be positioned around the periphery of a traffic sign 210, such as a stop sign, to increase its visibility. A solar panel 220 may be employed in this application as the power generator 110 to charge a battery 230 to power the LEDs 200 to provide service in areas where hard-wired electrical power is not available or where the installation is temporary. The positioning of the LEDs 200 on the sign 210 may vary depending on the particular implementation. Also, the use of the LEDs 200 is not limited to signs or traffic signs, as illustrated in FIG. 2. Other types of traffic control devices, warning indicators, beacons, etc., may also be equipped with LEDs 200.

The LEDs 200 on the traffic sign 210 may operate continuously (i.e., 24 hours per day and 7 days per week). In the daytime, the blinking LEDs 200 may be controlled to be about twice as bright as during night operation. Intensity may be reduced at night to avoid blinding oncoming drivers. Also, at night, the duty cycle for the blinking LEDs 200 is generally reduced to conserve battery power, as there is no solar charging source available at night.

In other embodiments, the LEDs 200 may only be activated in response to an input signal, such as the pressing of a pushbutton, the triggering of a motion sensor, the detection of an oncoming vehicle, etc. In such cases, the controller 130 may charge the energy storage device 120 using the power generator 110, but only activate the LEDs 200 in response to the input. Once activated, the LEDs 200 may continue to operate for a programmable time interval that may vary depending on the particular application. Alternatively, the controller 130 may continue to operate the LEDs 200 until another input signal is received.

In embodiment illustrated in FIG. 2, the LEDs 200 are generally located on the periphery of the traffic sign 210 and are caused to blink approximately once each second. Of course, other blink rates may be employed. The LED duty cycle (i.e., the percentage of LED "on" time compared with the total blink time cycle) may be adjusted up or down between about 10% and 50%, and the LED brightness may be adjusted up or down by varying the current between about 10% and 100% to adapt the load power requirements to the environmental conditions that affect the energy storage rate of the solar panel 220 as specified by a determined energy storage metric. The controller 130 thus limits power usage when the amount of battery recharging from the solar panel 220 is limited in poor weather conditions to be able to maintain reasonable LED flashing operation in such adverse conditions.

More particularly, in the embodiment of FIG. 2, the controller 130 monitors the energy generated by the solar panel 220 for charging the battery 230 during a programmable time interval and adjusts the brightness level and/or duty cycle of the LEDs 200 for a subsequent time interval based on the amount of energy stored. The amount of solar charging provided from the fixed solar panel 220 to the rechargeable battery 230 is influenced by a large number of uncontrolled parameters, such as time of day, angle of the sun, and weather conditions, such as degree of cloudiness, rain, snow, sleet, ice, ambient temperature, etc. The controller 130 adjusts the operation of the blinking LEDs 200 so that the LEDs 200 can continue to operate over the wide variety of solar charging conditions that may be encountered, which may be favorable or quite adverse.

The controller 130 includes a solar charge detector 240, an LED control unit 250, and a blink cycle timer 260. The solar charge detector 240 generates a stored energy metric representing the relative amount of energy stored in the battery 230 for the time interval. The blink cycle timer 260 controls the blinking of the LEDs 200. The LED control unit 250 uses the stored energy metric to set the intensity and/or duty cycle of the power signal provided to the LEDs 200 by controlling the current supplied to the LEDs 200 and/or setting the timing parameters of the blink cycle timer 260. A memory 265 may also be provided for storing control parameters for the controller (e.g., time intervals, thresholds, load control settings, etc.) or for logging various data parameters (e.g., voltage, energy storage parameters, load power control parameters) or events (e.g., activations of the controller 130 via pushbutton or sensor, battery voltage minimum and maximum voltage threshold crossings, etc.). A communications device 270 may be provided for accessing the data logged in the memory 265 or for programming the control parameters of the controller 130. The communications device 270 may be implemented using a wireless communication device, such as a cell phone or WiFi transceiver to allow communication with a remote location, or the communications device 270 may be embodied in an external port for receiving an external connector to allow configuration or data retrieval in the field.

In the illustrated embodiment, eight LEDs 200 are disposed on the traffic sign 210. The LEDs 200 are located proximate the vertices of an octagonal stop sign. In applications where the traffic sign 210 has a different shape, the number and distribution of the LEDs 200 may vary. By locating the LEDs 200 near the periphery of the sign 210, they tend to increase its visibility. The LEDs 200 may be connected in parallel and operated from by the blink cycle timer 260 using power from the solar panel 220 and the rechargeable battery 230.

Exemplary LEDs 200 that may be used are Luxeon 1 watt star-type LEDs, part number LXHL-MD1D, offered by Quadica Developments, Inc. of Brantford, Ontario, Canada. Each LED 200 may be fitted with a focusing lens to cause the LED output light to be concentrated into a relatively narrow light cone angle (e.g., with an apex of about 20 degrees). This focusing causes the light output to be a maximum of about 660,000 millicandella at a 20 degree viewing angle. This relatively narrow light cone angle enables the LED light output to be aimed approximately at oncoming traffic when the traffic sign face is aimed perpendicular to the direction of the highway or street.

The operating range of the LEDs 200 employed by the controller 130 need not be based on the actual maximum rated current of the LEDs as the 100% value. For example, increasing the brightness of the LEDs 200 past a certain point requires non-linearly increasing quantities of drive current. Hence, driving the LEDs 200 past a certain point yields a decreasing return when comparing the additional light output gained to the drive current required. Although the LEDs 200 are illustrated as being discrete, it is contemplated that cluster LEDs or single LEDs may be used.

Various techniques may be used to implement the solar charge detector 240. In one embodiment, the solar charge detector 240 is a millivolt indicator which measures voltage across a calibrated 1.0 ohm resistor, so that the millivolt reading equals the milliamp current being supplied to the battery 230.

The LED control unit 250 records the millivolt readings at 1.0 second intervals for a 10 minute time interval. Again, the length of the time interval may vary. At the end of the time interval, the 120 individual readings may be averaged to obtain the average milliamp charge provided to the battery during the interval. The average milliamp charge to the battery 230 during the time interval is divided by the maximum output of the solar panel 220 in full sun to obtain the energy storage metric as a percentage of the theoretical maximum. Based on the energy storage metric, the LED control unit 250 selects the LED operating characteristics for the next 10 minute time interval.

In the illustrated embodiment, the LED control unit 250 may adjust the LED operating characteristics, also referred to as power consumption characteristics, in a normal mode of operation by changing the "on" time duty cycle of the blinking LEDs 200, typically between a maximum of 50% down to a minimum of 1%. In addition, the LED brightness may also be adjusted by controlling the drive current per LED from between about 100% down to about 10% for normal mode operation. Combining these two LED adjustment parameters, there is a large variation between the minimum (10% duty cycle at 10% drive current per LED) and the maximum (50% duty cycle and 100% drive current per LED). This variation provides adjustment capability to adjust the power consumption characteristics of the blinking LEDs 200 so as to control load demand to optimize battery power consumption during the subsequent time interval based on the energy storage metric stored at the end of the previous time interval. In the illustrated embodiment, the LED control unit 250 employs a lookup table 255 programmed into a read-only memory contained that is accessed using the value of the energy storage metric. An exemplary lookup table 255 for setting the LED operating characteristics to control load demand is illustrated by the chart of FIG. 3.

The controller 130 may also monitor the battery voltage for control purposes at the extreme high and low ends of the battery voltage spectrum. For example, in a battery save mode of operation, charging may be terminated at very high battery voltages, and battery power consumption may be limited at very low battery voltages. When there is an excess of solar charging, the battery 230 voltage rises. The battery 230 can be selected from a variety of different types, including but not limited to, lead acid, lead acid gel cell, nickel metal hydride (NiMH), lithium-ion (Li-Ion), PEM fuel cell, or DMFC fuel cell. When the battery voltage reaches a 100% charge level, which may be greater than the rated voltage of the battery, it is preferred to stop the solar panel charging. Also, when the battery voltage drops below a particular level (e.g., about 80% of maximum), the controller 130 decreases LED operation to a minimum, i.e. about 10% of the drive current per LED and 10% duty cycle, herein referred to as a battery save mode level. If the battery voltage drops below a second threshold (e.g., 75% of maximum), the controller 130 entirely terminates operation of the LEDs 200 until the battery voltage once again rises above the 75% level. The various thresholds used for battery save mode decisions may vary depending on the particular battery type used.

In a normal mode (i.e., between the upper and lower battery voltage extremes), the energy storage metric from the previous time interval determines the LED power consumption and operating characteristics for the subsequent time interval, so as to attempt to optimize the use of stored battery power and thereby extend the LED run time.

Figure 3:
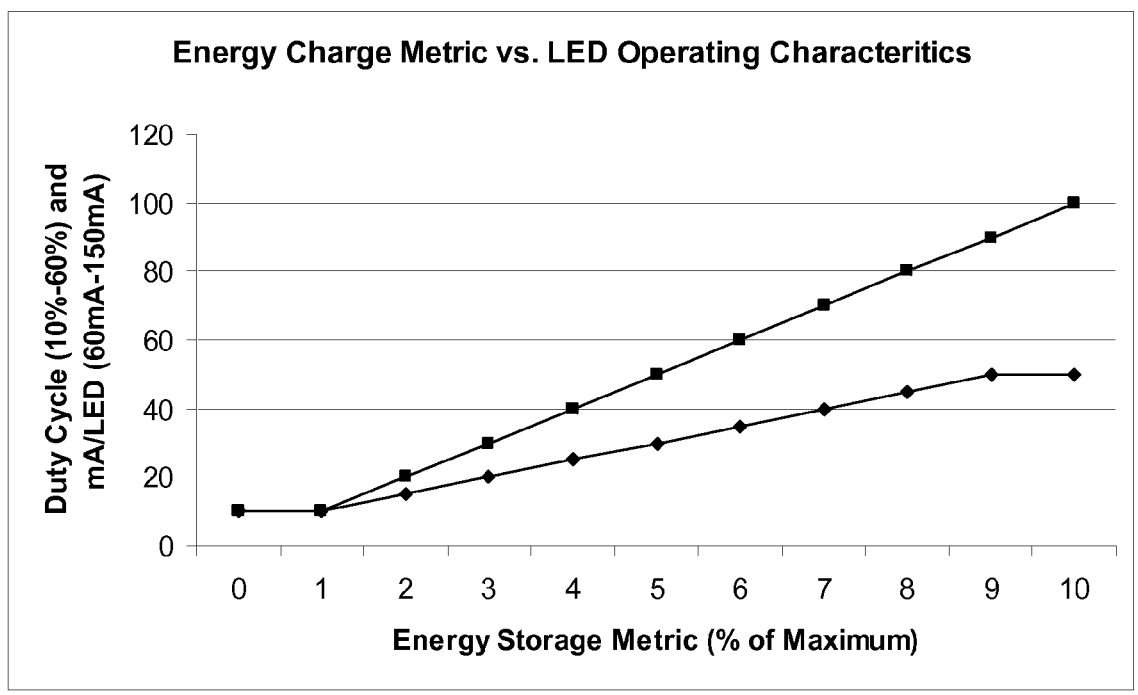
FIG. 3 is a diagram illustrating LED operating characteristics that may be used by the system of FIG. 2 to manage the LED load.

As shown in FIG. 3, in normal mode, there are ten levels of adjustment which may be made in the LED brightness as well as ten levels of adjustment which may be made to the LED duty cycle. Even though FIG. 3 illustrates ten levels of adjustment, the number of levels of adjustment can be arbitrarily selected to suit the particular application. For example, the specific nature of the load 140 may dictate the types of load power adjustments that may be made, and accordingly, the number of parameters that are varied and the granularity of the adjustments may also vary.

As described above, the LED operating adjustment levels are implemented based on the solar charging parameter recorded at the end of the previous time interval. If the amount of solar charging is high, then the LED brightness and/or the LED duty cycle may also be high, as there will be sufficient energy in the battery 230 to support these high levels of LED power consumption. Conversely, if the amount of solar charging is low, then the LED duty cycle can be reduced and/or the LED brightness can be lowered, to avoid consuming excess battery power which has not been replaced by solar recharging. An advantage of reducing the Led brightness based on the level of charging is that when there is overcast weather and the amount of solar charging is reduced, the LED brightness does not need to be as high as in sunny weather. The LED control unit 250 automatically balances battery charging with LED power consumption on a long term operating basis, without requiring surveillance or regular maintenance checks.

When there is no solar charge detected, the LED control unit 250 transitions into night mode operation, where the LED brightness is reduced to about 10% of drive current per LED, which is sufficient for night viewing, but much less than the maximum daytime LED brightness. Also, the LED duty cycle is reduced to about 10%. The LED operating characteristics selected for night mode operation can also be arbitrarily adjusted to different values depending on the particular implementation.

Each morning, when solar charging and normal mode operation resumes, the LED operating characteristics are adjusted according to the amount of solar charging being provided to the battery 230.

Figure 4:
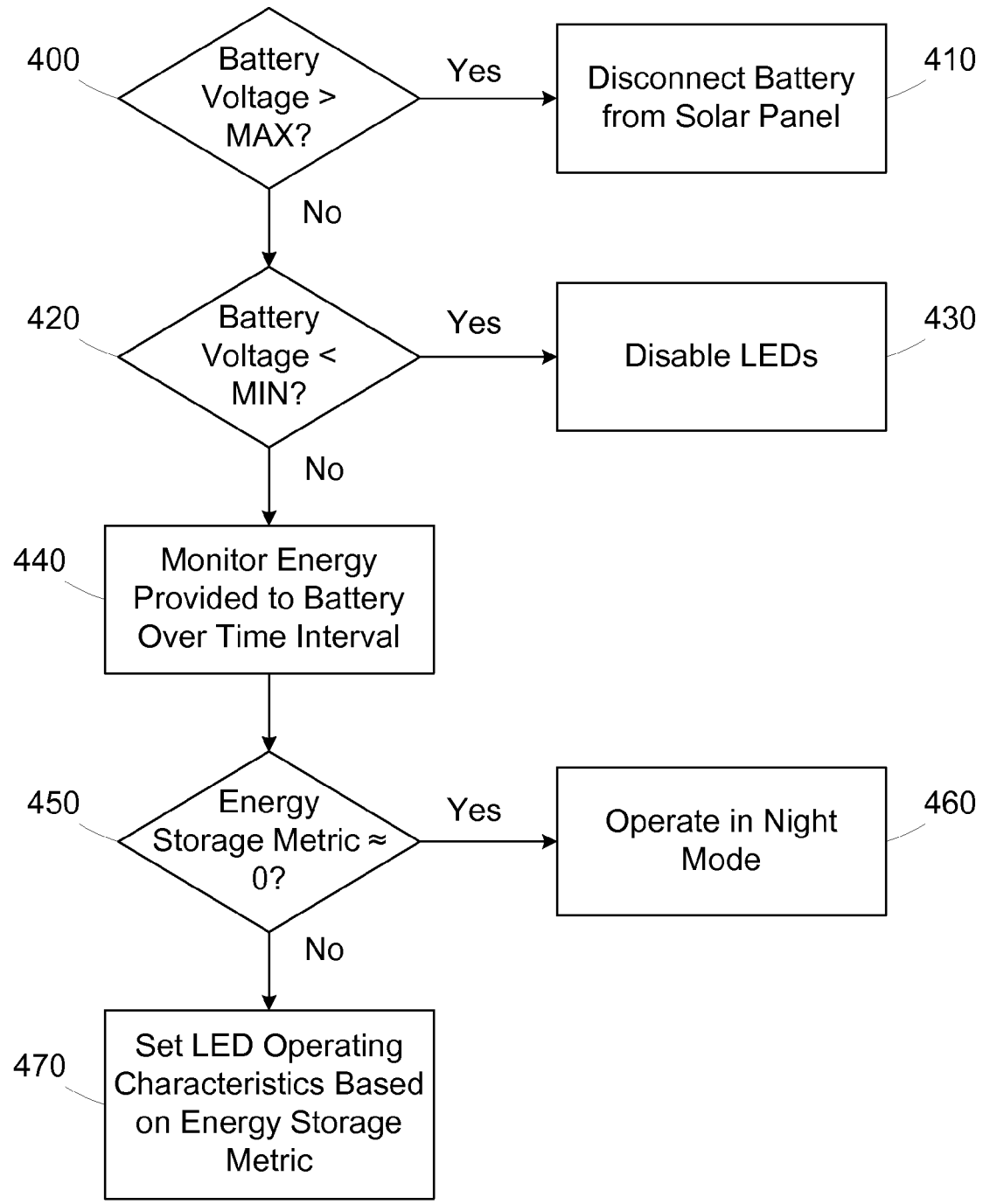
FIG. 4 is a simplified flow diagram of a method for managing the LED load characteristics in the system of FIG. 2.

Turning now to FIG. 4, a simplified flow diagram of a method for managing load power consumption in accordance with one illustrative embodiment of the present invention is shown. In method block 400, it is determined if the voltage of the battery 230 is above a maximum charge threshold. In this instance, the maximum charge threshold represents a fully charged state of the battery 230. If the voltage is above the maximum charge threshold in method block 400, the battery 230 is isolated from the solar panel 220 in method block 310 to avoid over-charging. In method block 420, the voltage of the battery 230 is compared to a minimum voltage threshold that represents a discharged state of the battery 230. To avoid damaging the battery 230, the LEDs 200 are isolated from the battery 230 in method block 430 responsive to the voltage being less than the minimum voltage threshold.

Although the voltage limits defined by method blocks 400 and 420 are illustrated as being linear steps in the flow diagram, it is contemplated that these checks may be performed non-sequentially, and may override the normal mode of operation described in the following paragraphs.

In method block 440, the power stored in the battery 230 is monitored for a programmable time interval by the solar charge detector 240 to generate an energy storage metric. As described above, the energy storage metric is a percentage value that represents the amount of energy stored in the battery 230 compared to the expected full power output of the solar panel 220.

If the energy storage metric is approximately zero in method block 450 (i.e., there is no output from the solar panel 220), the LED characteristics are set to night mode operating values (e.g., 10% drive current and 10% duty cycle). If the energy storage metric is not approximately zero in method block 450, the LED characteristics are set based on the energy storage metric at the levels illustrated in FIG. 3. The language approximately zero is intended to cover a range of low power levels that are near zero. In some cases a small level of light may be received by the solar panel, so the energy storage metric may not be exactly zero. Within the context of the LED characteristics shown in FIG. 3, approximately zero would cover anything less than 10%, which represents the lowest action level. That range may differ depending on the particular implementation and the load control parameters and increments used therein.

The load control techniques described herein have numerous advantages. Even in total overcast weather, the solar charging normally continues during daytime at levels of at least about 15% to 25% of full sun conditions. With up to a foot of snow covering the solar panel 220, solar charging is still being provided to the battery 230. Therefore, by the automatic load control techniques described herein, the LEDs 200 may continue to operate in both day and night conditions even during periods of total overcast weather. Naturally, the LED brightness and duty cycle will be reduced in overcast weather, but in these conditions, the LED brightness does not need to be as bright as full sun conditions. Hence, all types of ambient lighting and solar charging conditions can be accounted for without loss of LED operation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A system, comprising:
   a lighting device;
   a rechargeable battery operable to power the lighting device;
   a power generator operable to charge the rechargeable battery; and
   a controller operable to generate an energy storage metric representing a quantity of energy generated by the power generator and stored in the rechargeable battery during a first time interval and adjust at least one power consumption characteristic of the lighting device for a second time interval based on the energy storage metric, wherein the energy storage metric is generated based on a comparison of an output of the power generator and a predetermined output of the power generator.

2. The system of claim 1, wherein the energy storage metric comprises a percentage of a maximum output of the power generator over the first time interval.

3. The system of claim 1, wherein the at least one power consumption characteristic comprises an intensity characteristic of the lighting device.

4. The system of claim 1, wherein the at least one power consumption characteristic comprises a duty cycle characteristic of the lighting device.

5. The system of claim 1, wherein the controller is operable to access a lookup table specifying the at least one power consumption characteristic as a function of the energy storage metric.

6. The system of claim 1, wherein the controller is operable to isolate the power generator from the rechargeable battery responsive to a voltage of the battery being greater than a predetermined threshold.

7. The system of claim 1, wherein the controller is operable to disable the lighting device responsive to a voltage of the rechargeable battery being less than a predetermined threshold.

8. A system, comprising:
a lighting device;
a rechargeable battery operable to power the lighting device;
a solar panel operable to charge the rechargeable battery; and
a controller operable to generate an energy storage metric representing a quantity of energy generated by the solar panel and stored in the rechargeable battery during a first time interval and adjust at least one power consumption characteristic of the lighting device for a second time interval based on the energy storage metric, wherein the energy storage metric is generated based on a comparison of an output of the solar panel and a predetermined output of the solar panel.

9. The system of claim 8, further comprising a sign, wherein the lighting device is mounted to the sign.

10. The system of claim 9, wherein the lighting device comprises a plurality of light emitting diodes mounted to the sign.

11. The system of claim 10, wherein the controller is operable to control an intensity of the light emitting diodes by controlling an amount of current provided per light emitting diode.

12. The system of claim 10, wherein the sign comprises a plurality of vertices, and the light emitting diodes are disposed proximate at least one of the vertices.

13. The system of claim 8, further comprising a traffic control device, wherein the lighting device is mounted to the traffic control device.

14. The system of claim 8, wherein the controller is operable to control a duty cycle of the lighting device based on the energy storage metric.

15. The system of claim 8, wherein the controller is operable to control an intensity of the lighting device based on the energy storage metric.

16. The system of claim 8, wherein the controller comprises:
a blink cycle timer operable to control blinking of the lighting device in accordance with a duty cycle;
a solar charge detector operable to indicate an energy output of the solar panel; and
a control unit operable to monitor the energy output indicated by the solar charge detector to generate the energy storage metric and determine the power consumption characteristic based on the energy storage metric.

17. The system of claim 8, wherein the controller is operable to access a lookup table specifying the at least one power consumption characteristic as a function of the energy storage metric.

18. The system of claim 8, wherein the energy storage metric is a percentage of a maximum output of the solar panel.

19. The system of claim 8, wherein the controller is operable to isolate the solar panel from the rechargeable battery responsive to a voltage of the battery being greater than a predetermined threshold.

20. The system of claim 8, wherein the controller is operable to disable the lighting device responsive to a voltage of the battery being less than a predetermined threshold.

21. The system of claim 8, wherein the controller is operable to operate the lighting device in a night mode responsive to the energy storage metric being less than a predetermined threshold.

22. The system of claim 8, further comprising a memory device, wherein the controller is operable to store at least one parameter associated with its operation in the memory device.

23. The system of claim 22, further comprising a communications device operable to communicate with the memory device.

24. The system of claim 23, wherein the communications device comprises a wireless communications device.

25. The system of claim 8, wherein the controller is operable to enable operation of the lighting device responsive to receiving an external input signal.

26. The system of claim 25, wherein external input signal comprises at least one of a pushbutton signal or a sensor signal.

27. The system of claim 8, wherein the comparison comprises a ratio of the output of the solar panel to the predetermined output of the solar panel.

28. A method for controlling power consumption of a lighting device powered by a rechargeable battery, comprising:
monitoring energy stored in the rechargeable battery by a power generator to generate an energy storage metric representing a quantity of energy generated by the power generator and stored in the rechargeable battery during a first time interval, wherein the energy storage metric is generated based on a comparison of an output of the power generator and a predetermined output of the power generator; and
adjusting a power consumption characteristic of the lighting device for a second time interval based on the energy storage metric.

29. The method of claim 28, wherein the energy storage metric is a percentage of a maximum output of the power generator.

30. The method of claim 28, wherein the power consumption characteristic comprises an intensity characteristic of the lighting device.

31. The method of claim 28, wherein the power consumption characteristic comprises a duty cycle characteristic of the lighting device.

32. The method of claim 28, further comprising accessing a lookup table specifying the at least one power consumption characteristic as a function of the energy storage metric.

* * * * *